United States Patent
Kim et al.

(10) Patent No.: US 9,467,360 B2
(45) Date of Patent: Oct. 11, 2016

(54) SYSTEM, DEVICE AND METHOD FOR MANAGING NETWORK TRAFFIC BY USING MONITORING AND FILTERING POLICIES

(71) Applicant: SK TELECOM CO., LTD., Seoul (KR)

(72) Inventors: Nam Gun Kim, Seoul (KR); In Jang Jeong, Seoul (KR); Seong Soo Bae, Seongnam-si (KR); Chang Moon Han, Seoul (KR); Won Jun Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 357 days.

(21) Appl. No.: 14/099,360

(22) Filed: Dec. 6, 2013

(65) Prior Publication Data

US 2014/0095711 A1    Apr. 3, 2014

Related U.S. Application Data

(63) Continuation of application No. PCT/KR2012/007231, filed on Sep. 7, 2012.

(30) Foreign Application Priority Data

Jun. 27, 2011 (KR) .................. 10-2011-0062222

(51) Int. Cl.
*G06F 15/173* (2006.01)
*H04L 12/26* (2006.01)
(Continued)

(52) U.S. Cl.
CPC ....... *H04L 43/0876* (2013.01); *H04L 41/0893* (2013.01); *H04L 63/1408* (2013.01); *H04L 63/0236* (2013.01); *H04L 63/0263* (2013.01)

(58) Field of Classification Search
CPC ........... H04L 41/0893; H04L 43/0876; H04L 63/0236; H04L 63/0263; H04L 63/1408
USPC ......................................................... 709/224
See application file for complete search history.

(56) References Cited

U.S. PATENT DOCUMENTS 7,607,174 B1 * 10/2009 Kashchenko ........... G06F 21/74
                                                              726/23
7,774,498 B1 * 8/2010 Kraemer ................. H04L 63/20
                                                              709/224

(Continued)

FOREIGN PATENT DOCUMENTS

KR    1020040057257 A    7/2004
KR    1020050031215 A    4/2005

(Continued)

OTHER PUBLICATIONS

Korean Office Action for application No. 10-2011-0062222 dated Jan. 13, 2014.
International Search Report mailed Mar. 11, 2013 for PCT/KR2012/007231.

*Primary Examiner* — Wing F Chan
*Assistant Examiner* — Joseph Maniwang
(74) *Attorney, Agent, or Firm* — Hauptman Ham, LLP

(57) ABSTRACT

Disclosed herein are a system for managing network traffic by using monitoring and filtering policies, including: a network traffic managing device to manage network traffic by (i) creating a monitoring policy and a filtering policy and (ii) transmitting the created monitoring policy and the created filtering policy to a user terminal device; and a traffic control device to detect packets generated in one or more applications of the user terminal device, according to the one or more applications or one or more destination addresses based on the monitoring policy received from the network traffic managing device, create and transmit traffic statistical information on the detected packets to the network traffic managing device, and filter the packets according to the filtering policy received from the network traffic managing device at a kernel area of the user terminal device.

20 Claims, 5 Drawing Sheets

(51) Int. Cl.
*H04L 29/06* (2006.01)
*H04L 12/24* (2006.01)

(56) References Cited

U.S. PATENT DOCUMENTS

2003/0149888 A1* 8/2003 Yadav .............. H04L 63/1408
726/23

2012/0144246 A1* 6/2012 Dreyfoos .............. G06F 11/302
714/47.1

FOREIGN PATENT DOCUMENTS

| KR | 1020060044050 A | 5/2006 |
| KR | 100615620 B1 | 8/2006 |
| KR | 1020100024723 A | 3/2010 |
| KR | 1020110027386 A | 3/2011 |

* cited by examiner

SYSTEM, DEVICE AND METHOD FOR MANAGING NETWORK TRAFFIC BY USING MONITORING AND FILTERING POLICIES

CROSS-REFERENCE TO RELATED APPLICATION

The present application is a continuation of International Application No. PCT/KR2012/007231 filed on Sep. 7, 2012. The disclosures of the above-listed applications are hereby incorporated by reference herein in their entirety.

FIELD

The present disclosure relates to a system, a device and a method for managing network traffic by using monitoring and filtering policies

BACKGROUND

The statements in this section merely provide background information related to the present disclosure and do not constitute prior art.

As user terminals including a smart phone and a tablet PC have been vitalized, various sorts of applications have appeared. Among them, applications such as a messenger in want of a function of receiving or sending packets, and applications for transmitting data to a specific server are increasing. The inventor(s), however, has noted that it is impossible in a current network of communication enterprises to monitor traffic occurring in all the applications, and block unnecessary and malicious traffic.

An application in the form of the messenger transmits a location of a user terminal (or user terminal device, or user equipment) loaded with the corresponding application to the corresponding server for a packet receiving function. That is, the corresponding server should know the location of the user terminal for packet transmission. To this end, the inventor(s) has noted that a session is maintained between the user terminal and the corresponding server, and the location information of the user terminal is periodically or temporarily transmitted to the corresponding server. The inventor(s) has noted that data for maintaining the session (for example, a keep-alive message, and a heart beat message), not related to transmission of real messages, is periodically exchanged between the user terminal and the corresponding server in order to maintain the session. Since transmission/reception of the data for maintaining the session is independently performed for each application, when many messenger applications are installed or driven in one terminal, the inventor(s) has experienced that loads are increased in the network systems of the communication enterprises.

Moreover, the inventor(s) has noted that there is also an application which steals data from an arbitrary user terminal without a user's knowledge, and leaks the data to a malicious user's server. Accordingly, the inventor(s) has noted that technologies for detecting and controlling data traffic of the user terminal are being required to rapidly discover the data traffic in advance, and block the data traffic if necessary.

SUMMARY

In accordance with an aspect of the present disclosure, a system for managing network traffic by using monitoring and filtering policies comprises a network traffic managing device and a traffic control device. The network traffic managing device is configured to manage network traffic by (i) creating a monitoring policy and a filtering policy and (ii) transmitting the created monitoring policy and the created filtering policy to a user terminal device. And the traffic control device is configured to detect and classify packets generated in one or more applications of the user terminal device, according to the one or more applications or one or more destination addresses based on the monitoring policy received from the network traffic managing device, create and transmit traffic statistical information on the detected packets to the network traffic managing device, and filter the packets according to the filtering policy received from the network traffic managing device at a kernel area of the user terminal device.

In accordance with another aspect of the present disclosure, a traffic control device for controlling traffic by using monitoring and filtering policies comprises a packet collecting unit, a packet monitoring unit, a traffic managing unit and a packet filtering unit. The packet collecting unit is configured to collect packets generated in one or more applications of a user terminal device, according to port numbers in the user terminal device. The packet monitoring unit is configured to detect packets conforming to a monitoring policy according to the one or more applications or one or more destination addresses at a kernel area of the user terminal device, among the collected packets. The traffic managing unit is configured to create traffic statistical information through an analysis of the detected packets, transmit the traffic statistical information to a network traffic managing device, and receive a filtering policy responsive to the transmitted traffic statistical information from the network traffic managing device. And the packet filtering unit is configured to filter packets of the one or more applications corresponding to the received filtering policy, or packets having one or more blocked destination addresses included in the filtering policy at the kernel area of the user terminal device.

In accordance with another aspect of the present disclosure, a traffic control device is configured to receive the monitoring policy from a network traffic managing device; collect packets generated in one or more applications of a user terminal device, according to port numbers; detect the packets conforming to the received monitoring policy according to the one or more applications or one or more destination addresses through monitoring the received packets at a kernel area of the user terminal device; create traffic statistical information through an analysis of the detected packets; transmit the created traffic statistical information to the network traffic managing device, and receiving the filtering policy from the network traffic managing device; and filter the packets of the one or more applications corresponding to the received filtering policy, or the packets having the blocked destination addresses included in the filtering policy at the kernel area of the user terminal device.

DETAILED DESCRIPTION

Figure 1:
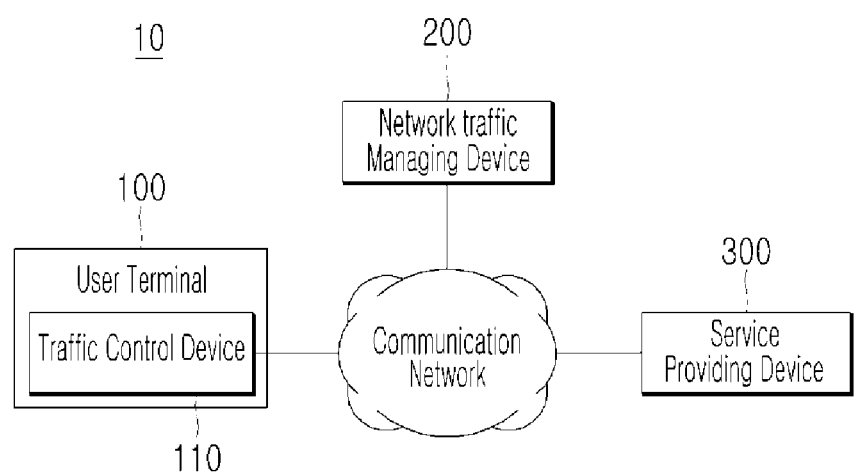
FIG. 1 is a block diagram of a configuration of a network traffic managing system using monitoring and filtering policies according to at least one embodiment of the present disclosure.

Hereinafter, embodiments of the present disclosure will be described in detail with reference to the accompanying drawings. Configuration and the corresponding effect of the present disclosure will be clearly understood from the following detailed description. Prior to the detailed description of the present disclosure, it is noted that although shown in different drawings, the same elements are provided with the same reference numerals in the drawings, and detailed descriptions related to well-known functions or configurations will be omitted when they makes subject matters of the present disclosure obscure. The present disclosure is to provide a system and a method for managing network traffic by using monitoring and filtering policies, in which a user terminal side (i.e., user terminal device) detects packets of applications according to the monitoring policy, transmits traffic statistical information of the detected packets to a network traffic managing device, and filters the packets according to the filtering policy received from the network traffic managing device, thereby rapidly and easily detecting an incidental data communication traffic (for example, data for maintaining sessions) capable of causing communication network overloads or a malicious user's traffic, and filtering the detected traffic in the user terminal side.

FIG. 1 is a block diagram of a configuration of a network traffic managing system using monitoring and filtering policies according to at least one embodiment of the present disclosure.

As shown in FIG. 1, the network traffic managing system 10 using the monitoring and filtering policies according to at least one embodiment of the present disclosure includes a traffic control device 110 included in a user terminal 100 (i.e., user terminal device, hereinafter referred to as user terminal for description convenience), a network traffic managing device 200, and a service providing device 300. Other components of the network traffic managing system 10, such as the traffic control device 110, the network traffic managing device 200, and the service providing device 300 are implemented by one or more processors and/or application-specific integrated circuits (ASICs).

The network traffic managing device 200 manages network traffic between the user terminal 100 and the service providing device 300. To this end, the network traffic managing device 200 is configured to create the monitoring policy and the filtering policy, and transmit the created monitoring and filtering policies to the traffic control device 110 included in the user terminal 100 to manage the traffic. Here, the network traffic managing device 200 receives traffic statistical information from the traffic control device 110 to identify the traffic statistical information of the user terminal 100. Moreover, the network traffic managing device 200 is configured to create the filtering policy through an analysis of the traffic statistical information of the user terminal 100 to transmit the created filtering policy to the traffic control device 110. The network traffic managing device 200 previously collects traffic information on the traffic to be managed, create the filtering policy, and transmit the created filtering policy to the traffic control device 110.

Here, a communication network refers to a network for providing a communication service such that the user terminal 100, the network traffic managing device 200, and the service providing device 300 communicates with each other in wired and wireless manners. That is, the communication network is a wired internet network, and includes a wireless data network (an wireless internet network, and an IP Multimedia Subsystem (IMS) network) connected through a mobile communication network (CDMA, and W-CDMA), or an internet network connected through a near field communication such as Wi-Fi.

The traffic control device 110 controls traffic occurring through applications 101 installed in the user terminal 100. Here, terminal including a notebook computer, a smart phone, a Personal Digital Assistant (PDA), a navigation system, a Portable Multimedia Player (PMP), an electronic dictionary, and an MP3 player, which can perform a traffic control function, is applied to the user terminal 100 irrespective of sorts thereof. The traffic control device 110 performs the traffic control function through a traffic control program provided from a network based external system or an external storage medium.

Describing the traffic control process, the traffic control device 110 is configured to detect and classify packets, which have occurred in the applications of the user terminal 100, according to applications and destination addresses based on the monitoring policy which was received from the network traffic managing device 200, at a kernel area of the user terminal 100. The traffic control device 110 transmits traffic statistical information on the detected packets to the network traffic managing device 200. Thereafter, the traffic control device 110 filters the packets of applications corresponding to the filtering policy received from the network traffic managing device 200, or the packets having blocked destination addresses included in the filtering policy at the kernel area of the user terminal 100.

Figure 2:
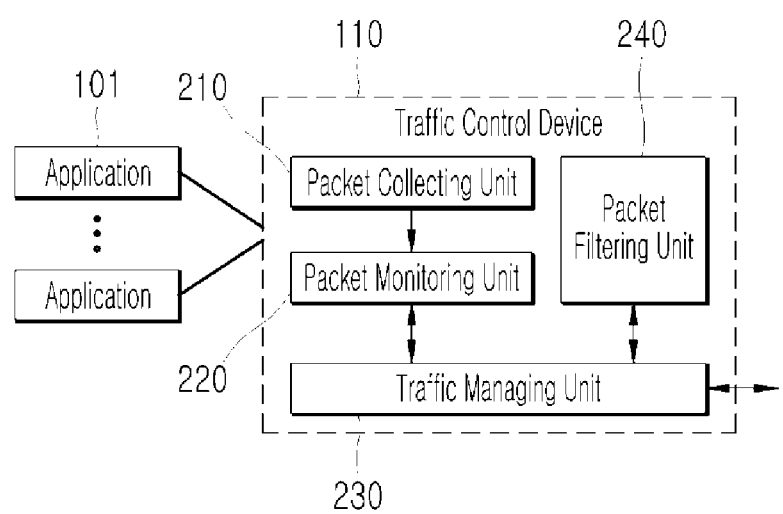
FIG. 2 is a block diagram of a configuration of a traffic control device using monitoring and filtering policies according to at least one embodiment of the present disclosure.

FIG. 2 is a block diagram of a configuration of a traffic control device using monitoring and filtering policies according to at least one embodiment of the present disclosure.

Hereinafter, respective elements of the traffic control device according to the at least one embodiment of the present disclosure will be described.

As shown in FIG. 2, the traffic control device 110 includes a packet collecting unit 210, a packet monitoring unit 220, a traffic managing unit 230, and a packet filtering unit 240. Here, the traffic control device 110 receives the packets occurring in the applications 101 installed in the user terminal 100. Other components of the traffic control device 110, such as the packet collecting unit 210, the packet monitoring unit 220, the traffic managing unit 230, and the packet filtering unit 240 are implemented by one or more processors and/or application-specific integrated circuits (ASICs).

The packet collecting unit 210 is configured to collect and classify the packets, which have occurred in the applications 101 installed in the user terminal 100, according to port numbers in the user terminal 100.

The packet monitoring unit 220 is configured to detect and classify the packets conforming to a monitoring policy according to applications or destination addresses at a kernel area of the user terminal, among the packets which have been collected in the packet collecting unit 210.

Specifically describing the packet monitoring process, the packet monitoring unit 220 is configured to monitor and classify the packets of the applications 101 using predetermined known ports or predetermined unknown ports according to transmission/reception ports, among the packets which have been collected by the packet collecting unit 210.

Describing the known ports and the unknown ports, the applications 101 is classified into applications using the predetermined known ports and applications using the predetermined unknown ports. For example, the applications using the predetermined known ports include a web browser. Packet transmission/reception of the applications using the predetermined known ports basically pass without comparison of the policy. On the other hand, the packet monitoring unit 220 is configured to assume that the packets of the applications using the predetermined unknown ports operate according to standards thereof, and detects the packets according to the monitoring policy. Here, port numbers which the applications 101 use are referred to as known ports when the port numbers which the applications 101 of the user terminal 100 use are registered in the network traffic managing device 200. The unknown ports refer to port numbers not registered in the network traffic managing device 200.

The packet monitoring unit 220 extracts at least one selected from the group consisting of protocol information, a destination address, and a port number through monitoring the packets of the applications 101 using predetermined unknown ports. When the applications using the known ports conform to the filtering policy, the packet monitoring unit 220 reduces the packets to monitor by monitoring only the packets of the applications 101 using the unknown ports.

At this time, the packet monitoring unit 220 extracts at least one selected from the group consisting of the protocol information, the destination address, and the port number through monitoring the packets of the applications 101 using the predetermined unknown ports only when sockets are created. Since the applications 101 have identical protocol information, an identical destination address, and an identical port number after the sockets are created between the applications 101 and the service providing device 300, the packet monitoring unit 220 reduces packet monitoring loads through extracting the at least one selected from the group consisting of the protocol information, the destination address, and the port number only when the sockets are created. Here, the packet monitoring unit 220 is configured to extract a destination MAC address, a destination IP address, and a destination port number as a destination address.

More, the packet monitoring unit 220 calculates a packet creation period through monitoring the packets of the applications 101 using the predetermined unknown ports. For example, when the packet creation period has been configured in the monitoring policy, the packet monitoring unit 220 detects the packets of the applications 101 which exceed the packet creation period.

Meanwhile, the packet monitoring unit 220 determines only the presence or not of receiving/sending packets without inspecting payloads of the applications 101. Through this, the packet monitoring unit 220 can reduce the loads for the packet monitoring. The packet monitoring unit 220 captures and separately analyzes the whole packet data, that is, a packet header and a packet payload, or transmits the whole packet data to the network traffic managing device 200.

Thereafter, the packet filtering unit 240 filters the packets of the applications corresponding to the filtering policy or the packets having the blocked destination addresses included in the filtering policy at the kernel area of the user terminal 100. Here, the filtering policy is received from the network traffic managing device 200. The packet filtering unit 240 filters the packets of the applications 101 corresponding to the filtering policy or the packets having the blocked destination addresses of the filtering policy by using a net-filter operating at the kernel area of the user terminal 100. The packet filtering unit 240 creates a handler (for example, iptalbes handler, libipq*) configured to control, at the user area, the filtering policy operating at the kernel area of the user terminal 100, and controls the net-filter performing filtering through the created handler.

Meanwhile, the traffic managing unit 230 is configured to create traffic statistical information through an analysis of the packets detected in the packet monitoring unit 220. The traffic managing unit 230 transmits the created traffic statistical information to the network traffic managing device 200.

Figure 3:
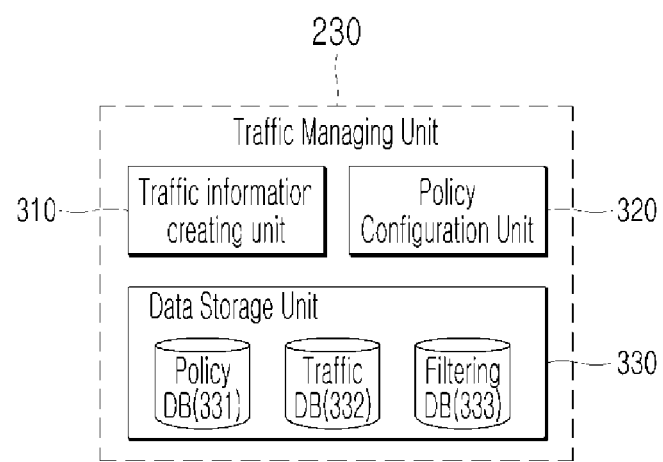
FIG. 3 is a block diagram of a detailed configuration of a traffic managing unit of FIG. 2 according to at least one embodiment of the present disclosure.

FIG. 3 is a block diagram of a detailed configuration of a traffic managing unit of FIG. 2 according to at least one embodiment of the present disclosure.

As shown in FIG. 3, the traffic managing unit 230 includes a traffic information creating unit 310, a policy configuration unit 320, and a data storage unit 330. Here, the data storage unit 330 includes a policy DB 331, a traffic DB 332, and a filtering DB 333. Other components of the traffic managing unit 230, such as the traffic information creating unit 310 and the policy configuration unit 320 are implemented by one or more processors and/or application-specific integrated circuits (ASICs).

The traffic information creating unit 310 analyzes the packets detected in the packet monitoring unit 220 according to applications and destination addresses to create traffic statistical information. The traffic statistical information includes the number and size of packets according to the applications for a predetermined period of time, and the number and size of packets according to the destination addresses for a predetermined period of time.

The policy configuration unit 320 configures the received monitoring and filtering policies in the packet monitoring unit 220 and the packet filtering unit 240, respectively. The monitoring policy includes an application list, protocol information, port numbers, a packet creation period, and destination addresses, which will be monitored. The filtering policy includes a blocked application list, and a blocked destination address list.

The data storage unit 330 stores the traffic statistical information created in the traffic information creating unit 310, the traffic information, and the packet information for the filtered packets.

More specifically, the data storage unit 330 stores the received monitoring and filtering policies in the policy DB 331. Moreover, the data storage unit 330 stores the traffic statistical information according to the applications and the destination addresses, which have been created in the traffic information creating unit 310, in the traffic DB 332. Moreover, the data storage unit 330 stores the packet information, which has been filtered in the packet filtering unit 240, in the filtering DB 333.

Figure 4:
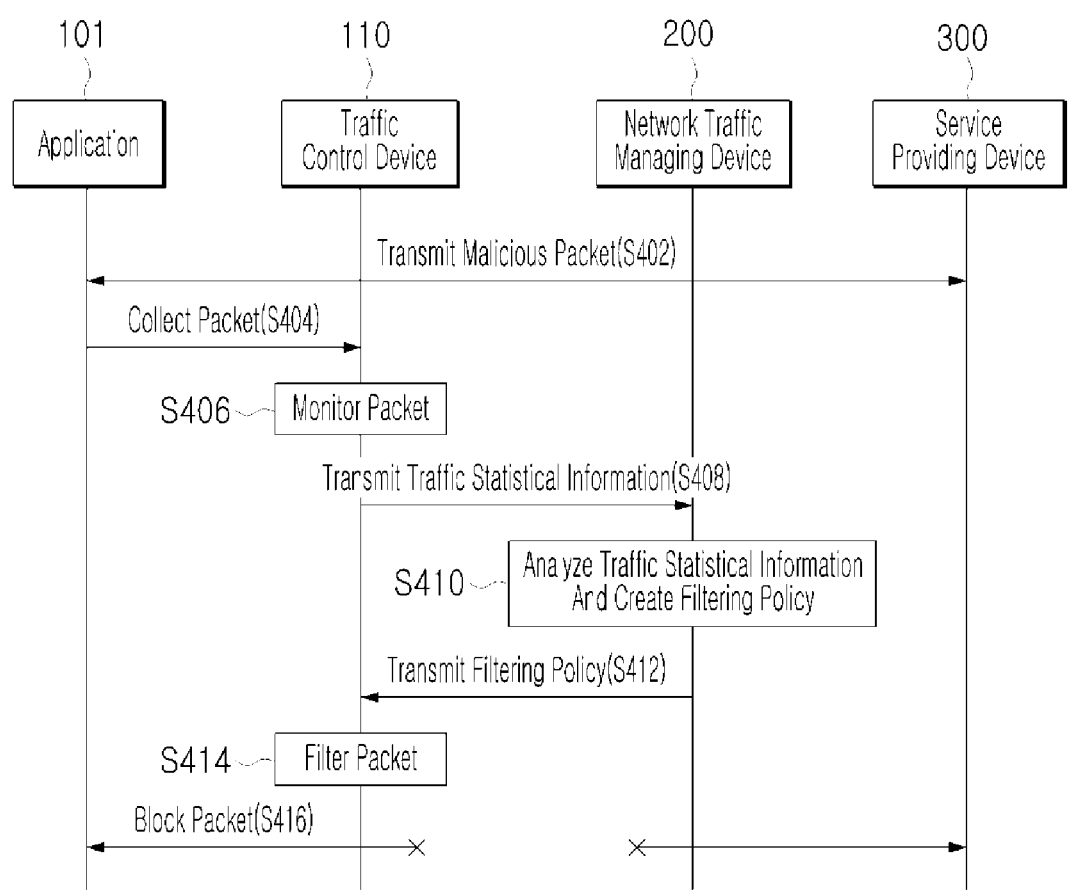
FIG. 4 is a signal flow diagram of a network traffic managing method using monitoring and filtering polices according to at least one embodiment of the present disclosure.

FIG. 4 is a signal flow diagram of a network traffic managing method using monitoring and filtering polices according to at least one embodiment of the present disclosure.

Applications 101 installed in a user terminal 100 transmit/receive packets for maintaining sessions, or malicious packets to/from a service providing device 300 (S402).

A traffic control device 110 collects packets from the applications 101 installed in the user terminal 100 (S404).

The traffic control device 110 monitors the collected packets according to a monitoring policy (S406).

The traffic control device 110 creates traffic statistical information by using the monitored result of the monitoring process S406, and transmits the created traffic statistical information to a network traffic managing device 200 (S408).

The network traffic managing device 200 analyzes the traffic statistical information received from the traffic control device 110, and creates a filtering policy by using the analyzed result.

The network traffic managing device 200 transmits the created filtering policy to the traffic control device 110 (S412).

The traffic control device 110 filters packets of the applications 101 according to the filtering policy received from the network traffic managing device 200 (S414).

The traffic control device 110 blocks the packets of the applications 101 according to the received filtering policy (S416). In process S416, the process of blocking the packets has been described. In process S416, the traffic control device 110 blocks or permits the packets according to the filtering policy.

Figure 5:
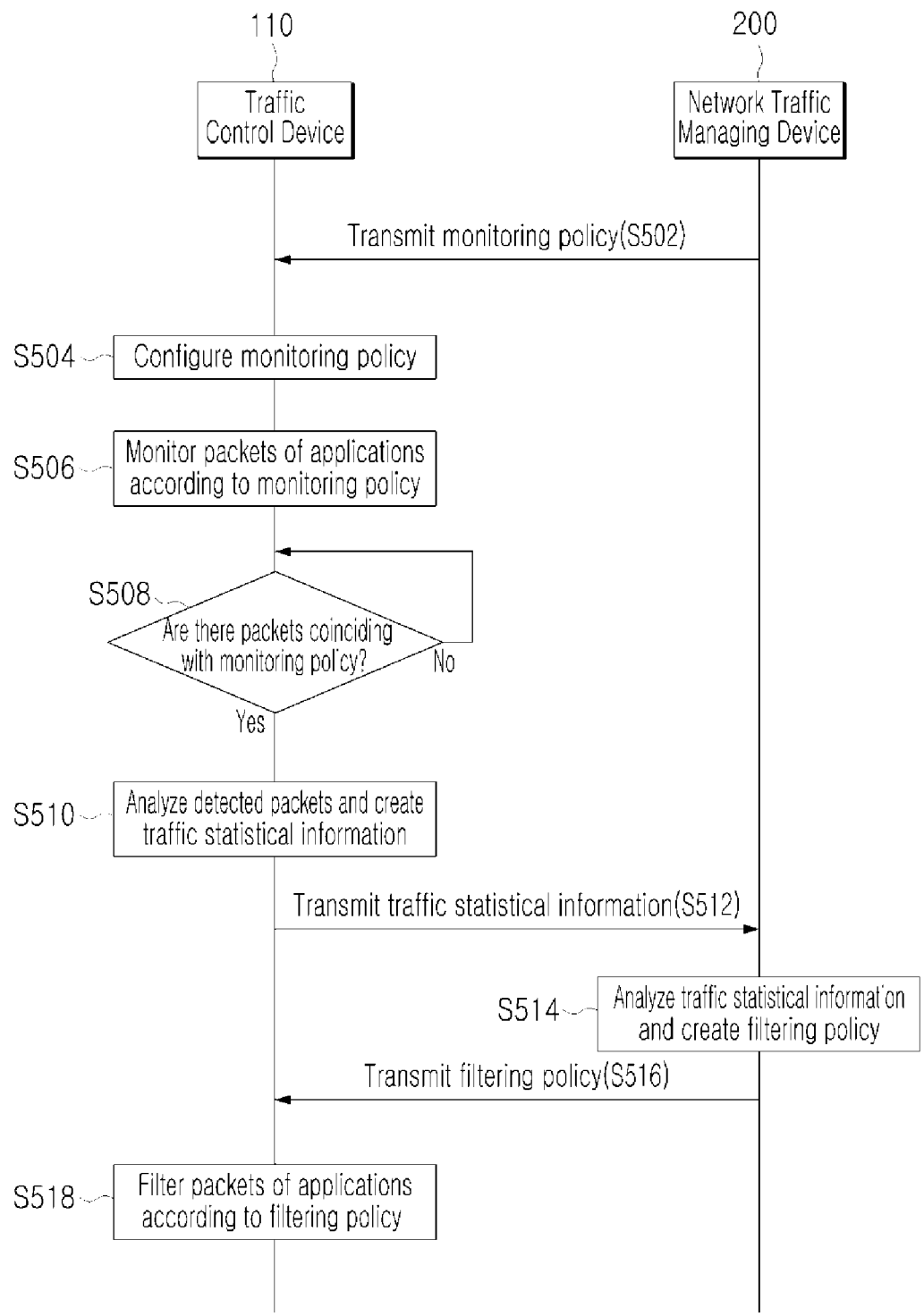
FIG. 5 is a flowchart of a traffic control method in a traffic control device according to at least one embodiment of the present disclosure.

FIG. 5 is a flowchart of a traffic control method in a traffic control device according to at least one embodiment of the present disclosure.

A network traffic managing device 200 transmits a monitoring policy to a traffic control device 110 (S502). Then, a traffic managing unit 230 (not shown in FIG. 5) of the traffic control device 110 receives the monitoring policy (S502).

The traffic managing unit 230 configures the received monitoring policy in a packet monitoring unit 220 (not shown in FIG. 5) of the traffic control device 110 (S504).

Thereafter, a packet collecting unit 210 (not shown in FIG. 5) of the traffic control device 110 collects and classify packets created in applications 101 installed in a user terminal 100 according to port numbers, and the packet monitoring unit 220 monitors the packets collected from the applications 101 according to the monitoring policy (S506).

The packet monitoring unit 220 determines whether or not the packets conforming to the monitoring policy exist, through packet monitoring at a kernel area of the user terminal 100 (S508). The packet monitoring unit 220 detects and classifies the packets according to applications and destination addresses.

When it is determined that the packets conforming the monitoring policy exist (S508), the traffic managing unit 230 analyzes the packets detected in the packet monitoring unit 220 to create traffic statistical information (S510).

The traffic managing unit 230 transmits the created traffic statistical information to the network traffic managing device 200 (S512).

The network traffic managing device 200 analyzes the received traffic statistical information, and creates a filtering policy by using the analyzed result (S514).

The network traffic managing device 200 transmits the created filtering policy to the traffic control device 110 (S516).

A packet filtering unit 240 (not shown in FIG. 5) of the traffic control device 110 filters the packets of the application 101 according to the filtering policy received from the traffic control device 110 (S518). That is, the packet filtering unit 240 filters the packets of the applications corresponding to the filtering policy, or the packets having the blocked destination addresses included in the filtering policy at the kernel area of the user terminal.

Meanwhile, the data traffic control method described above is realized as a software program to be recorded in a non-transitory computer readable recording medium so that the present disclosure is applied to various playback devices.

The various playback devices include a personal computer, a notebook computer, a portable terminal, and a smart phone. For example, the non-transitory computer readable recording medium is an embedded type recording medium including a hard disk, a flash memory, a RAM, and a ROM, or a removable type recording medium including an optical disk such as a CD-R and a CD-RW, a compact flash card, a smart media, a memory stick, and a multimedia card.

In this case, the program recorded in the non-transitory computer readable recording medium is executed, while including receiving the monitoring policy from the network traffic managing device; collecting the packets created in the application of the user terminal according to the port number; detecting the packets conforming the received monitoring policy according to applications and destination addresses through monitoring the collected packets at the kernel area of the user terminal; creating the traffic statistical information through the analysis of the detected packets; transmitting the created traffic statistical information to the network traffic managing device, and receiving the filtering policy from the network traffic managing device; and filtering the packets of the application corresponding to the received filtering policy, or the packets having the blocked destination address included in the filtering policy, at the kernel area of the user terminal.

According to the present disclosure, the user terminal side detects the packets of the applications according to the monitoring policy, transmits the traffic statistical information of the detected packets to the network traffic managing device, and filters the packets according to the filtering policy received from the network traffic managing device, thereby rapidly and easily detecting and filtering an incidental data communication traffic (for example, data for maintaining sessions) capable of causing communication network overloads, or a user's malicious traffic.

According to various embodiments of the present disclosure, the traffic necessary for processes of providing a push service such as registration and authentication of an application and keep-alive message transmission can be minimized, and messages capable of increasing network loads can be previously filtered. The various embodiments of present disclosure are to provide that packets of applications against the monitoring and filtering policies, malicious applications, or applications abnormally causing traffic can be rapidly recognized and filtered. Further, according to various embodiments of the present disclosure, the applications of the user terminal are classified into the applications using the predetermined known ports and the applications using the predetermined unknown ports such that the packets of the applications using the predetermined unknown ports are monitored and filtered, and the packets of the applications using the known ports pass, in which case the packets in want of the monitoring and the filtering can be reduced, and thus operation reduction of the user terminal device can be achieved.

Some embodiments as described above are implemented in the form of one or more program commands that can be read and executed by a variety of computer systems and be recorded in any non-transitory, computer-readable recording medium. The computer-readable recording medium includes a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device is configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Although various exemplary embodiments of the present disclosure has been described for illustrative purposes, those skilled in the art will appreciate that various modifications, additions and substitutions are possible, without departing from the scope and spirit of the claimed invention as disclosed in the accompanying claims. Accordingly, the present disclosure is not limited to the embodiments disclosed in the specification of the present disclosure. The scope of the claimed invention is to be determined by not only the following claims but also their equivalents. Specific terms used in this disclosure and drawings are used for illustrative purposes and not to be considered as limitations of the present disclosure.

The invention claimed is:

1. A system for managing network traffic by using monitoring and filtering policies, the system comprising:
  a network traffic managing device, implemented by one or more processors and/or application-specific integrated circuits (ASICs) and, configured to manage network traffic by (i) creating a monitoring policy and a filtering policy and (ii) transmitting the monitoring policy and the filtering policy to a user terminal device,
    wherein the monitoring policy includes at least one selected from the group consisting of an application list, protocol information, port numbers, a packet creation period and destination addresses, and
    the monitoring policy is created to detect packets of applications installed in the user terminal device, the packets of the applications being transmitted to a service providing device, and
    wherein the filtering policy includes at least one selected from the group consisting of a blocked application list and a blocked destination address list, and
    the filtering policy is created to filter, among the detected packets of the applications, all or a part of packets related to an incidental data communication traffic causing communication network overloads; and
  a traffic control device, implemented by one or more processors and/or application-specific integrated circuits (ASICs) and, configured to
    detect and classify the packets generated in the applications of the user terminal device, according to the applications or one or more destination addresses based on the monitoring policy received from the network traffic managing device,
    create and transmit traffic statistical information on the detected packets to the network traffic managing device, the created traffic statistical information is used to create the filtering policy by the network traffic managing device, and
    filter the packets of the applications by blocking data traffic of all or a part of packets causing communication network overloads based on the filtering policy received from the network traffic managing device, at a kernel area of the user terminal device.

2. A traffic control device for controlling traffic by using monitoring and filtering policies, the traffic control device comprising:
  a packet collecting unit, implemented by one or more processors and/or application-specific integrated circuits (ASICs) and, configured to collect packets generated in one or more applications of a user terminal device, according to port numbers in the user terminal device;
  a packet monitoring unit, implemented by one or more processors and/or application-specific integrated circuits (ASICs) and, configured to detect packets conforming to a monitoring policy according to the one or more applications or one or more destination addresses at a kernel area of the user terminal device, among the collected packets, wherein the monitoring policy includes at least one selected from the group consisting of an application list, protocol information, the port numbers, a packet creation period and the destination addresses, and
    the monitoring policy is created to detect packets of applications installed in the user terminal device, the packets of the applications being transmitted to a service providing device, and;
  a traffic managing unit, implemented by one or more processors and/or application-specific integrated circuits (ASICs) and, configured to
    create traffic statistical information through an analysis of the detected packets,
    transmit the traffic statistical information to a network traffic managing device, the traffic statistical information used to create a filtering policy by the network traffic managing device, and
    receive the filtering policy responsive from the network traffic managing device, wherein the filtering policy includes at least one selected from the group consisting of a blocked application list and a blocked destination address list, and the filtering policy is created to block data traffic of all or a part of packets causing communication network overloads based on the transmitted traffic statistical information; and
  a packet filtering unit, implemented by one or more processors and/or application-specific integrated circuits (ASICs) and, configured to filter the packets of the one or more applications or packets having one or more blocked destination addresses by blocking data traffic of all or a part of packets causing communication network overloads based on the filtering policy, at the kernel area of the user terminal device.

3. The traffic control device of claim 2, wherein the traffic managing unit comprises:
  a traffic information creating unit configured to create the traffic statistical information through the analysis of the detected packets, and transmit the traffic statistical information to the network traffic managing device;
a policy configuration unit configured to configure the monitoring policy and the filtering policy in the packet monitoring unit and the packet filtering unit, respectively;
a policy DataBase (DB) configured to store the monitoring policy and the filtering policy;
a traffic information DB configured to store the created traffic statistical information; and
a filtering DB configured to store packet information on the filtered packets.

4. The traffic control device of claim 2, wherein
the packet collecting unit is configured to classify the collected packets, according to port numbers in the user terminal device, and
a packet monitoring unit configured to classify the detected packets conforming to a monitoring policy according to the one or more applications or the one or more destination addresses at the kernel area of the user terminal device, among the collected packets.

5. The traffic control device of claim 2, wherein the packet monitoring unit is configured to monitor the packets of the one or more applications using predetermined known ports or predetermined unknown ports according to port numbers, among the collected packets.

6. The traffic control device of claim 5, wherein the packet monitoring unit is configured to extract at least one selected from the group consisting of protocol information, a destination address, and a port number, through monitoring the packets of the one or more applications using the predetermined unknown ports.

7. The traffic control device of claim 6, wherein the packet monitoring unit is configured to extract at least one selected from the group consisting of a destination MAC address, a destination IP address, and a destination port number for the destination address, through monitoring the packets of the one or more applications using the predetermined unknown ports.

8. The traffic control device of claim 5, wherein the packet monitoring unit is configured to extract at least one selected from the group consisting of the protocol information, the destination address, and the port number through monitoring the packets of the one or more applications when a socket is created by the one or more applications using the predetermined unknown ports.

9. The traffic control device of claim 5, wherein the packet monitoring unit is configured to calculate packet creation periods by which the packets occur in the one or more applications through monitoring the packets of the one or more applications using the predetermined unknown ports.

10. The traffic control device of claim 2, wherein the packet filtering unit is configured to filter the packets of the one or more applications corresponding to the filtering policy, or the packets having the blocked destination addresses of the filtering policy by using a net-filter operating at the kernel area of the user terminal device.

11. The traffic control device of claim 10, wherein the packet filtering unit is configured to
create a handler for controlling, at a user area, the filtering policy operating at the kernel area of the user terminal device, and
control the net-filter configured to perform filtering, by using the created handler.

12. A method for controlling data traffic by using a monitoring policy and a filtering policy, the method performed by a traffic control device implemented by one or more processors and/or application-specific integrated circuits (ASICs) to execute the method comprising:
receiving the monitoring policy from a network traffic managing device;
collecting packets generated in one or more applications of a user terminal device, according to port numbers in the user terminal device;
detecting the packets conforming to the monitoring policy according to the one or more applications or one or more destination addresses through monitoring the received packets at a kernel area of the user terminal device, wherein the monitoring policy includes at least one selected from the group consisting of an application list, protocol information, the port numbers, a packet creation period and the destination addresses, and
the monitoring policy is created to detect packets of applications installed in the user terminal device, the packets of the applications being transmitted to a service providing device, and;
creating traffic statistical information through an analysis of the detected packets;
transmitting the traffic statistical information to the network traffic managing device, the traffic statistical information used to create a filtering policy by the network traffic managing device;
receiving the filtering policy from the network traffic managing device, wherein the filtering policy includes at least one selected from the group consisting of a blocked application list and a blocked destination address list, and the filtering policy is created to block data traffic of all or a part of packets causing communication network overloads based on the transmitted traffic statistical information; and
filtering the packets of the one or more applications or packets having one or more blocked destination addresses by blocking data traffic of all or a part of packets causing communication network overloads based on the filtering policy, at the kernel area of the user terminal device.

13. The method of claim 12, further comprising:
classifying the collected packets, according to the port numbers, and
classifying the detected packets conforming to the received monitoring policy according to the one or more applications or the one or more destination addresses through monitoring the received packets at the kernel area of the user terminal device.

14. The method of claim 12, wherein the detecting of the packets comprises:
monitoring the packets of the one or more applications using predetermined known ports or predetermined unknown ports according to port numbers, among the collected packets.

15. The method of claim 13, wherein the detecting of the packets comprises:
extracting at least one selected from the group consisting of protocol information, a destination address, and a port number, through monitoring the packets of the one or more applications using the predetermined unknown ports.

16. The method of claim 15, wherein the detecting of the packets comprises:
extracting at least one selected from the group consisting of a destination MAC address, a destination IP address, and a destination port number for the one or more destination address, through monitoring the packets of the one or more applications using the predetermined unknown ports.

17. The method of claim 14, wherein the detecting of the packets comprises:
   extracting at least one selected from the group consisting of the protocol information, the destination address, and the port number through monitoring the packets of the one or more applications when a socket is created by the one or more applications using the predetermined unknown ports.

18. The method of claim 14, wherein the detecting of the packets comprises:
   calculating packet creation periods by which the packets occur in the one or more applications through monitoring the packets of the one or more applications using the predetermined unknown ports.

19. The method of claim 12, wherein the filtering of the packets comprises:
   filtering the packets of the one or more applications or the packets having the blocked destination addresses based on the filtering policy by using a net-filter operating at the kernel area of the user terminal device.

20. The method of claim 19, wherein the filtering of the packets comprises:
   creating a handler for the sake of controlling the filtering policy;
   operating the created handler at the kernel area of the user terminal device; and
   controlling the net-filter performing filtering by using the created handler.

* * * * *